March 31, 1936.  A. D. ROBBINS  2,035,507

SYNCHRONIZING MECHANISM

Filed July 26, 1934   2 Sheets-Sheet 1

INVENTOR:
Azor D. Robbins,
BY Redding, Greeley, O'Shea & Campbell
HIS ATTORNEYS

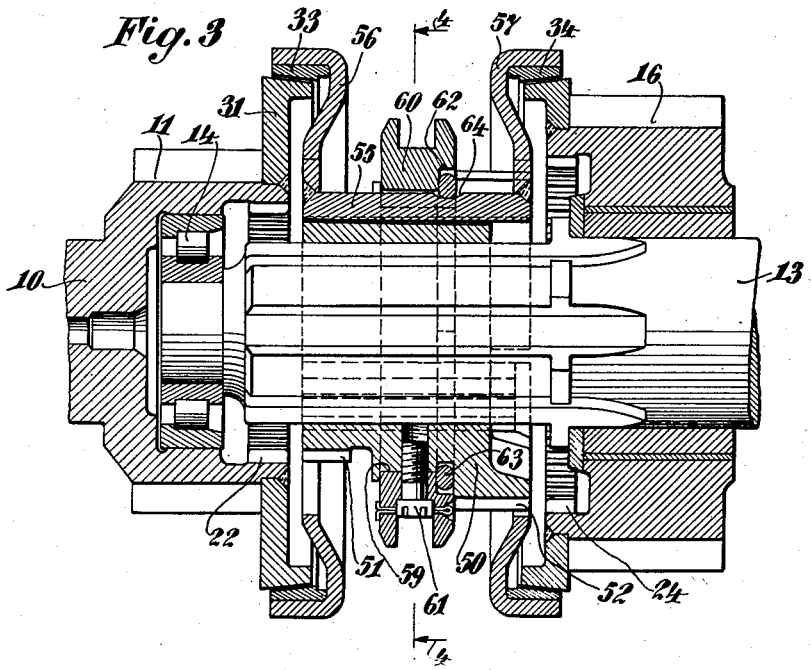

Patented Mar. 31, 1936

2,035,507

UNITED STATES PATENT OFFICE 2,035,507

SYNCHRONIZING MECHANISM

Azor D. Robbins, New Brunswick, N. J., assignor to International Motor Company, New York, N. Y., a corporation of Delaware Application July 26, 1934, Serial No. 737,034

5 Claims. (Cl. 192—53)

The present invention relates to transmission mechanisms and embodies, more specifically, an improved synchronizing device for transmissions by means of which silent shifting of the gears thereof is insured.

The present trend in the manufacture of transmission mechanisms for motor vehicles has been to mechanisms having the capacity of effecting shifting operations without giving rise to any clashing of the parts by reason thereof, thus avoiding noise and relieving the mechanism from shocks and stresses produced by such clashing. To accomplish the foregoing, transmissions have been designed wherein friction clutch mechanism is provided and incorporated in the transmission in such fashion that the clutch mechanism synchronizes the speeds of rotation of two relatively rotating parts as the parts are moved into engaging position.

It is to these forms of synchronizing mechanisms that the present invention relates and an object thereof is to provide a synchronizing device for transmissions wherein the design affords friction clutches of relatively large diameters, in combination with friction cones from which the clutches are held free when the mechanism is not in action.

A further object of the invention is to provide a synchronizing device of the above character, wherein the construction is such as to enable the shifter fork to be comparatively small in diameter, thus avoiding undesirable friction on the fork surface.

A further object of the invention is to provide a device of the above character wherein the toothed clutches may be made comparatively small in diameter and are so formed as to prevent engagement thereof until they have been synchronized.

A further object of the invention is to provide a device of the above character wherein the relatively movable clutch elements are so formed as to receive one of the friction clutch elements with provision for sliding motion but preventing relative rotary motion between such elements and the toothed clutch element.

Further objects, not specifically enumerated above, will be apparent as the invention is described in greater detail in connection with the accompanying drawings, wherein.

Figure 1:
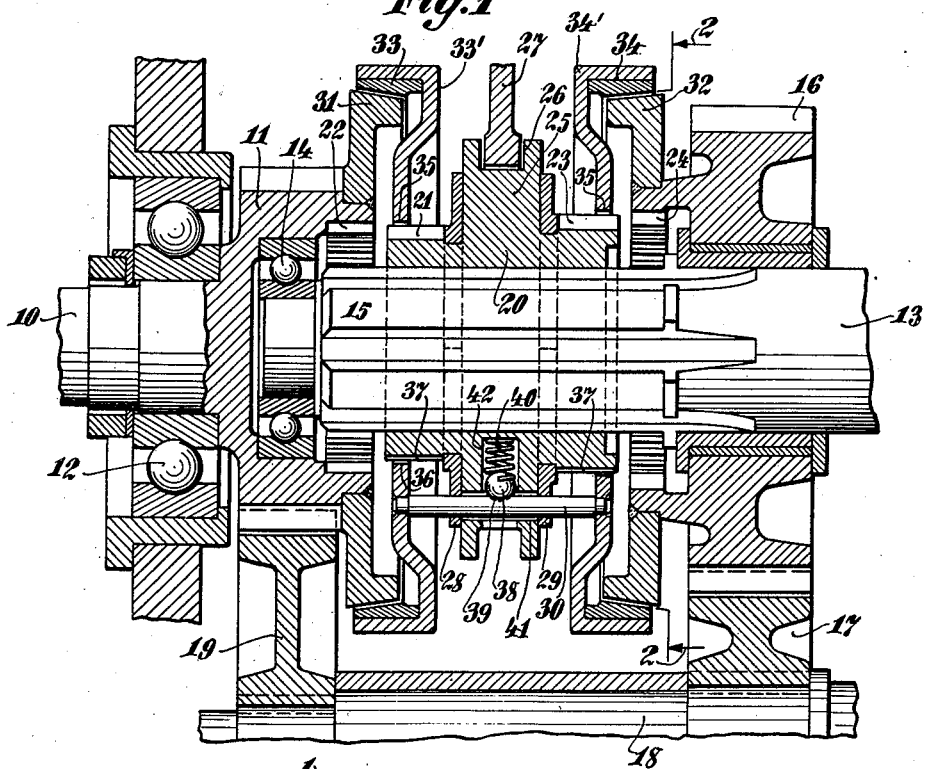
Figure 1 is a longitudinal view in section, taken through the axis of a transmission mechanism having incorporated therein a synchronizing device constructed in accordance with the present invention.
Figure 2:
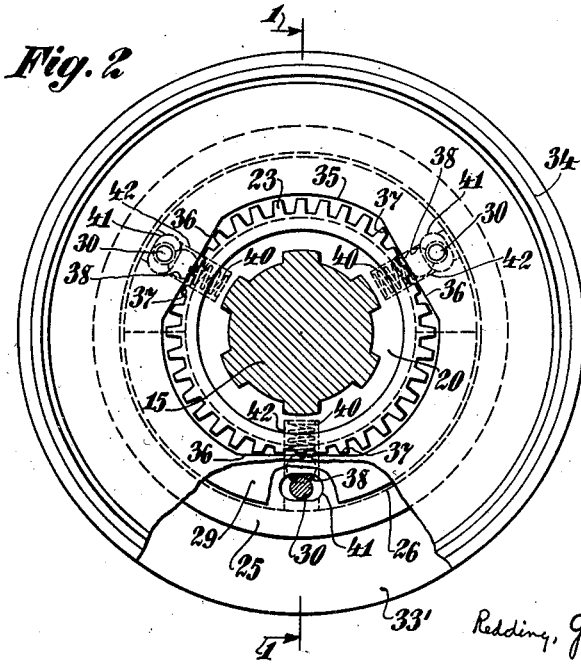
Figure 2 is a view in section, taken on line 2—2 of Figure 1, and looking in the direction of the arrows.

Figures 3 and 4 are similar to Figures 1 and 2, respectively, showing a modified form of the invention, Figure 4 being taken on line 4—4 of Figure 3 and looking in the direction of the arrows, while Figure 3 is taken on the line 3—3 of Figure 4 and looking in the direction of the arrows.

With reference to the above drawings, a driving shaft is shown at 10 upon which a driving pinion 11 may be formed, the shaft being journaled in a bearing 12 in the transmission housing. A driven shaft 13 is centered and journaled by bearing 14 within the driving pinion 11 and has a splined portion 15 formed thereon. Journaled upon the driven shaft is a driven gear 16 which is in constant mesh with a gear 17 secured to a countershaft 18. The countershaft is driven from the driving pinion 11 through a gear 19 which is in constant mesh with such pinion and secured to the countershaft 18.

Slidably mounted upon the splined section 15 is a clutch assembly 20. This clutch assembly is provided with a portion having clutch teeth 21 which are adapted to engage cooperating internal clutch teeth 22 in the driving pinion 11. The clutch assembly is also formed with a portion having clutch teeth 23 which are adapted to engage the internal clutch teeth 24, formed upon the gear 16. A flange 25 is formed on the clutch assembly and provided with a grooved peripheral portion 26 within which a shifter fork 27 is adapted to engage.

Upon the clutch assembly 20 are journaled collars 28 and 29 in which strut bars 30 are supported. Upon the driving pinion 11 and gear 16, respectively, are secured clutch cones 31 and 32, respectively, these cones being adapted to be engaged by synchronizing friction clutch members 33 and 34, respectively, carried upon balk rings 33' and 34', respectively. The balk rings 33' and 34' are formed with central openings 35 within which the toothed clutch members 21 and 23 are received. The openings 35 are formed with flat surfaces 36 and the toothed clutch members 21 and 23 are formed with spaced flat portions 37 to cooperate with the flat surfaces 36 and thus prevent relative rotation of rings 33' and 34' with respect to the clutch members 21 and 23.

The balk rings 33' and 34' are secured to the ends of the strut bars 30 and this assembly is centered by means of balls 38 which are urged into recesses 39, formed in the strut bars 30 by means of springs 40. The flange 25 of the clutch assembly 20 is formed with elongated openings 41 through which the strut bars 30 pass, the assembly of the synchronizing clutch members, strut bars and collars being effected by forming the collars 28 and 29 in halves in order that they may be assembled on the clutch assembly 20. As shown in the sectional view of Figure 1, the balls 38 and springs 40 are received in recesses 42, formed in the flange 25 and the mechanism is thus readily assembled and functions effectively to maintain the synchronizing clutches in a centered position.

When it is desired to engage the driving pinion 11, the clutch assembly 20 is moved to the left, as viewed in Figure 1 by means of the fork 27. The balls 38 carry the strut bars and synchronizing friction clutch member 34 in the same direction, thus frictionally engaging the clutch member 33 with the cone 31. If the driving pinion 11 is rotating faster than the clutch member 33, the latter will tend to turn in the same direction as the pinion due to the friction existing between the cone 31 and the clutch member 33. Inasmuch as the clutch member 33 cannot turn on the teeth 21, the speed of the clutch teeth 21 is synchronized with respect to the speed of teeth 22.

By reason of the angular plane which the surfaces 36 and 37 present to the direction of force applied to the clutch, these surfaces will engage with a relatively high pressure and thereby frictionally resist axial movement of the sliding clutch assembly. This resistance of the flat surfaces assists the springs and balls 38 in carrying the clutch member 33 into engagement with the cone 31. In this fashion, though considerable force may be applied to the shifting fork 27, the clutch teeth 21 cannot be clashed with the clutch teeth 22 of the driving pinion while their relative speeds of rotation differ. When the speed of rotation of the gear 11 and clutch assembly 20 are the same, the pressure on the flat surfaces 36 and 37 is relieved inasmuch as only the resistance of springs 40 must be overcome. In this fashion, the teeth 21 and 22 may be easily engaged.

In the construction shown in Figures 3 and 4, the assembly consists of elements united by simple welding operations. The spline shaft and associated gear construction is similar to the corresponding elements of the form of the invention shown in Figures 1 and 2 and therefore will not be described again. The clutch assembly, however, is formed of a plurality of elements including a clutch member 50 having clutch teeth 51 which are adapted to engage teeth 22 and teeth 52 which are adapted to engage teeth 24. The teeth 51 and 52 are cut away at three equidistantly spaced points around the peripheries thereof as shown at 53 in Figure 4, bosses 54 being formed at the bottoms of the cut-away portions and adapted to cooperate with balk ring ties 55, the ends of which are welded to balk rings 56 and 57 which are formed with the friction members 33 and 34, respectively. The balk ring ties 55 are formed with feet 58 which are adapted to engage the bosses 54 upon relative rotation of the rings with respect to the clutch member 50, the angle of contact between these members being such as to produce considerable frictional resistance to relative axial motion therebetween, as described in connection with the construction shown in Figures 1 and 2.

The clutch member 50 is formed with an intermediate circumferential groove 59 within which a two piece collar 60 is adapted to be secured. As shown in Figures 3 and 4, each piece of the collar is secured to the clutch hub by means of two screws 61. The collar is formed with a recess 62 within which a centering spring 63 is received, this centering spring engaging notches 64 in the balk ring ties 55 to center the clutch with respect to the clutch members 22 and 24. The resulting structure will be seen to be simple and readily manufactured and assembled, the elements thereof being few in number and positive in actuation.

From the foregoing, it will be apparent that a mechanism has been provided wherein the friction clutch members may be of relatively large diameter and are securely supported and maintained normally free from the friction cones when not in use. The shifter fork is relatively small in diameter thus avoiding undesirable friction on the fork surfaces and the tooth clutches may be small in diameter, the construction being such that these clutches cannot be engaged until they are accurately synchronized.

While the invention has been described with specific reference to the accompanying drawings, it is not to be limited, save as defined in the appended claims.

I claim as my invention:

1. A transmission mechanism having relatively rotatable members, one of which is slidable axially of the other, cooperating teeth on the members adapted to be engaged upon relative axial movement between the members, a plate secured to one of the members and formed with a friction surface adjacent its periphery, a second plate slidably but non-rotatably mounted upon the slidable member, the second plate and slidable member being formed with cooperating flat surfaces lying in angular planes with respect to the direction of force transmitted therebetween and spaced from the axis of the members, whereby relative rotation between the second plate and the slidable member causes engagement of the flat surfaces to produce a jamming action regardless of the relative axial position of the members, and a friction surface adjacent the periphery of the second plate adapted to cooperate with the first friction surface.

2. A transmission mechanism having relatively rotatable members, one of which is slidable axially of the other, cooperating teeth on the members adapted to be engaged upon relative axial movement between the members, a plate secured to one of the members and formed with a friction surface adjacent its periphery, a second plate slidably but non-rotatably mounted upon the slidable member, a friction surface adjacent the periphery of the second plate adapted to cooperate with the first friction surface, supporting rods slidably mounted on the slidable member and mounting the second plate, the slidable member being formed with elongated slots to receive the rods, the rods being slidably mounted in collars journaled on the slidable member, and yielding means to maintain the rods in a normal position.

3. A transmission mechanism having an axially fixed gear and a coaxially slidable clutch member, the gear and clutch member having cooperating clutch teeth, a plate secured to the fixed gear and formed with a conical friction surface, a second plate having a cooperating friction surface, means to mount the second plate slidably but non-rotatably on the clutch member, a peripheral flange on the clutch member adapted to be engaged by shifter mechanism, elongated slots in the flange, supporting rods in the slots, collars on opposite sides of the flange formed with apertures in which the rods are slidable axially, and means to mount the second plate on the rods.

4. A transmission mechanism having an axially fixed gear and a coaxially slidable clutch member, the gear and clutch member having cooperating clutch teeth, a plate secured to the fixed gear and formed with a friction surface, a second plate having a cooperating friction surface, means to mount the second plate slidably but non-rotatably on the clutch member, a peripheral flange on the clutch member adapted to be engaged by shifter mechanism, elongated slots in the flange, supporting rods in the slots, collars on opposite sides of the flange formed with apertures in which the rods are slidable axially, yielding means to center the rods on the flange, and means to mount the second plate on the rods.

5. A transmission mechanism having a gear, a coaxially slidable clutch member, cooperating clutch teeth on the gear and clutch member whereby the last named member may be moved axially to engage the gear, a plate secured to the gear and formed with a friction surface, a second plate having a cooperating friction surface, means to mount the second plate slidably but non-rotatably on the clutch member, the second plate and clutch member being formed with cooperating flat surfaces lying in angular planes with respect to the direction of force transmitted therebetween and spaced from the axis of the members, whereby relative rotation between the second plate and the slidable member causes engagement of the flat surfaces to produce a jamming action regardless of the relative axial position of the members, a peripheral flange on the clutch member adapted to be engaged by shifter mechanism, supporting rods slidably mounted on the flange, means to mount the second plate on the rods, and means to center the rods on the flange.

AZOR D. ROBBINS.